(12) United States Patent
Maor et al.

(10) Patent No.: US 8,229,360 B2
(45) Date of Patent: Jul. 24, 2012

(54) PORTABLE DIALER DEVICE AND METHOD

(76) Inventors: Ari Maor, Kiryat Motzkin (IL); Nir Ron, Even Yehuda (IL)

(*) Notice: Subject to any disclaimer, the term of this patent is extended or adjusted under 35 U.S.C. 154(b) by 463 days.

(21) Appl. No.: 12/063,107

(22) PCT Filed: Aug. 10, 2006

(86) PCT No.: PCT/IL2006/000936
§ 371 (c)(1),
(2), (4) Date: Jan. 11, 2009

(87) PCT Pub. No.: WO2007/017881
PCT Pub. Date: Feb. 15, 2007

(65) Prior Publication Data
US 2009/0186574 A1    Jul. 23, 2009

(51) Int. Cl.
*H04B 7/24* (2006.01)
*H04B 7/00* (2006.01)
*H04M 1/00* (2006.01)

(52) U.S. Cl. ........ 455/41.3; 455/66.1; 455/39; 379/441; 379/459

(58) Field of Classification Search ........... 455/414.1, 455/418, 419, 420, 39, 41.2, 41.3, 66.1, 68, 455/70; 379/441, 456, 459
See application file for complete search history.

(56) References Cited

U.S. PATENT DOCUMENTS

| | | | |
|---|---|---|---|
| 7,035,588 B2* | 4/2006 | Sim et al. | 455/41.2 |
| 7,212,190 B2* | 5/2007 | Fu | 345/163 |
| 7,245,909 B2* | 7/2007 | Goldberg et al. | 455/431 |
| 7,583,959 B2* | 9/2009 | Holmes | 455/418 |
| 7,881,701 B2* | 2/2011 | Chen et al. | 455/414.1 |
| 2002/0004720 A1* | 1/2002 | Janoska | 704/270 |
| 2004/0198328 A1* | 10/2004 | Brandenberger | 455/414.1 |
| 2004/0203697 A1* | 10/2004 | Finn | 455/420 |
| 2005/0070265 A1* | 3/2005 | Korpinen | 455/419 |
| 2005/0101261 A1* | 5/2005 | Weinzweig et al. | 455/74.1 |
| 2006/0030300 A1* | 2/2006 | Nimri et al. | 455/414.1 |
| 2006/0277108 A1* | 12/2006 | Altberg et al. | 705/14 |
| 2010/0228630 A1* | 9/2010 | Mikkelsen et al. | 705/14.66 |

FOREIGN PATENT DOCUMENTS
WO    WO 2004/049681    *    6/2004

* cited by examiner

*Primary Examiner* — Andrew Wendell
(74) *Attorney, Agent, or Firm* — Law Offices of Edward Langer

(57) ABSTRACT

An innovative portable dialer device and method for automatically initiating a telephone call of a pre-programmed telephone number stored as data representing tones, when the portable dialer device is brought near a telephone handset or a cellular telephone. The proposed portable dialer device enables a manual or automatic activation of the sequence of tones required for initiating the telephone call. In accordance with the preferred embodiment of the present invention, the portable dialer device is a refrigerator magnet dialer.

17 Claims, 9 Drawing Sheets

PORTABLE DIALER DEVICE AND METHOD

FIELD OF THE INVENTION

The present invention relates generally to a portable telephone number dialer device, and more particularly to a magnet-type hanging device with a telephone dialer (hereinafter: magnet dialer) for automatically initiating a telephone call using a pre-recorded dialing sequence when brought near a telephone handset.

BACKGROUND OF THE INVENTION

Many business corporations, fast food restaurants and the like, see the big business potential in giving specialty-manufactured gifts to customers and prospective customers in an effort to generate more business. These gifts are generally inexpensive items, such as business cards, pencils, calendars, clocks, and calculators. These items have been customized to carry company logos, addresses, telephone numbers and similar materials, and these customized details then become more accessible to potential customers, to promote commercial activity.

Business corporations may take such specialty-manufactured gifts one step further by printing their telephone number on a refrigerator magnet-type hanging device and then commercially distributing their own refrigerator magnet to clients. Such magnet-type hanging devices are useful for hanging various types of notes, bills, telephone numbers etc. on a refrigerator door for easy viewing and organizing household or any other information.

Several approaches known in the art are provided for producing portable telephone number dialer devices.

U.S. Pat. No. 5,963,637 to Arzoumanian discloses a dedicated telephone dialer capable of automatically dialing a pre-programmed calling card abbreviated telephone number at one speed, waiting for a short period and then dialing a preprogrammed access number and, optionally, a preprogrammed personal identification number (PIN) at a slower speed. This dialer comprises electrical circuitry for generating DTMF tones, logic for dialing the requisite numbers, and a switch for initiating the tones comprising the dialing sequence or sequences. For activating and initiating the telephone call, the telephone dialer must be held up to the microphone of an off-hook telephone handset so that the first digit of the access number is dialed from the telephone keypad.

However, this prior art telephone dialer does not automatically initiate the telephone call. To do so, the user is required to dial the first digit of the access number from the telephone keypad in order to activate a switch and initiate the telephone call.

U.S. Pat. No. 5,357,566 to Dowling et al discloses an object-oriented programmable dedicated dialer device. The device includes a hollow disc-shaped body having a housing and defining an interior cavity, a telephone number dialing mechanism disposed in the interior cavity, a sound-generating transducer, and a touch sensor mounted to the housing and connected to the telephone number dialing mechanism. A micro-controller is provided for storing a telephone number in its memory. The touch sensor is operable in response to contact with a user to activate the dialing mechanism to dial the stored telephone number. When activated, the dialing mechanism begins operation to generate the plurality of DTMF tones necessary to dial the stored telephone number. The touch sensor and a graphic or logo of the organization, whose telephone number is stored in the micro-controller, are both mounted on the exterior of the front cover of the housing.

However, this prior art dialer device requires the user to initiate the telephone call, since the device operates only in response to a user touching the touch sensor. According to this device, the user must touch a touch sensor in order to activate the dialing mechanism with respect to the relevant telephone number and initiate the telephone call.

Furthermore, the electrical circuitry in all prior art approaches generates DTMF tones for initiating the telephone call and these designs are relatively expensive to produce.

Prior art telephone dialers based on tone sequences are not designed to operate with cellular phones.

Therefore, it would be desirable to provide a magnet dialer for use with standard and cellular phones, for automatically initiating a telephone call and providing a dialing sequence, without requiring the user to initiate the telephone call.

SUMMARY OF THE INVENTION

Accordingly, it is a principal object of the present invention to overcome the disadvantages of prior art techniques used for a portable telephone number dialer device.

The present invention, in a preferred embodiment, discloses an innovative dialer device for storing data representing a sequence of tones and automatically initiating a telephone call when brought near a telephone handset. The proposed dialer device enables a manual or automatic activation of the dialing sequence of tones for initiating the telephone call.

In accordance with a preferred embodiment of the present invention, there is provided a portable dialer device for automatically initiating a telephone call using a pre-programmed dialing sequence when the portable dialer device is brought near a telephone handset, said portable dialer device comprising:

means connected to a power source, said means for storing and providing the pre-programmed dialing sequence of one or more telephone numbers;

an activation unit connected to said storing and providing means, for activating the pre-programmed dialing sequence required for initiating the telephone call; and communication means for presenting the pre-programmed dialing sequence as a signal in proximity to the telephone handset.

In a preferred embodiment, the storing and providing means is provided as a microprocessor or sequencer with a read-only memory, and is implemented as a digital audio player within which data representing a series of audio tones has been digitally stored. The audio tones may be part of a jingle used in advertising or promoting a commercial business establishment, and the tones may be distinctly heard or "buried" within the jingle.

In an alternative embodiment, the storing and providing means is implemented as a microprocessor which stores at least one pre-programmed telephone number and converts this into a dialing sequence of tones provided as DTMF tones by a speaker, which can be used for initiating a telephone call when held in proximity to the microphone of a telephone handset.

The activation unit may be provided as a sound sensor used by the dialer device for detecting the proximity of the telephone handset, by detecting a dial tone. When activated, the dialer device initiates its operation to provide audio dialing tones. As an alternative to a sound sensor, an optical sensor, or a capacitive touch sensor may be provided.

In another alternative embodiment, the inventive dialer device can be used with a cellular telephone, which does not generate a dial tone when used. In this case, the inventive dialer device is activated by an optical sensor or touch sensor, to communicate the telephone number dialing sequence to the cellular phone as data over an infra-red communication channel, for display on the cellular phone as a "new contact", labeled to identify the commercial establishment.

An alternative communication channel for communicating the telephone number dialing sequence as data to a cellular phone may be based on the Bluetooth protocol.

In addition to use for promoting commercial activity, by appropriate modification of the telephone number, the inventive portable dialer can be used to quickly dial emergency health or security services, or a doctor's office. Use of the inventive dialer can simplify the dialing procedure for the elderly or handicapped. Numerous applications can be envisioned to simplify and shorten the dialing procedure for any service, institution, store, or other location.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

The present invention discloses an innovative portable dialer device for initiating a telephone call of a pre-programmed dialing sequence when the portable dialer device is brought near a telephone handset. The portable dialer device enables a manual or automatic activation of the dialing sequence required for initiating the telephone call. In a preferred embodiment, the pre-programmed dialing sequence can be a sequence of tones for reaching a particular store, service or restaurant, which has its logo printed on a refrigerator magnet dialer.

In accordance with a preferred embodiment of the present invention, the portable dialer device is packaged in a very small housing for combination with a refrigerator magnet-type hanging device, so that it can be mounted on a refrigerator door. In this way, a user can automatically dial a telephone number of a particular store by bringing the refrigerator magnet dialer near the telephone handset. The refrigerator magnet dialer can automatically, reliably and simply dial a preprogrammed phone number. This replaces the need for manually dialing a telephone number or access code, and therefore the refrigerator magnet dialer is very simple-to-use, useful and convenient, and can even be operated by children.

Figure 1:
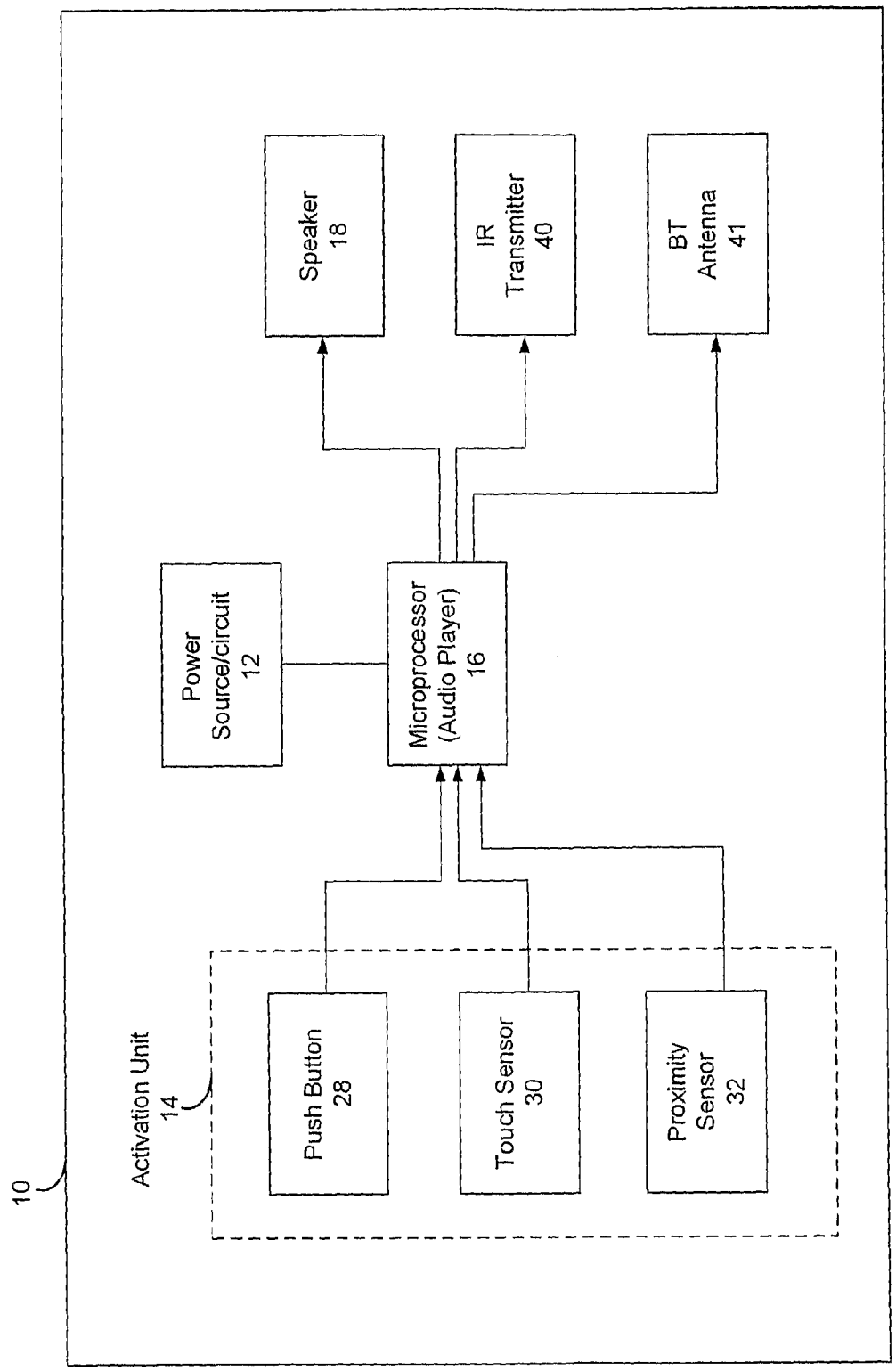
FIG. 1 shows a block diagram of the electrical circuitry implemented within a portable dialer device for storing data representing a sequence of tones and initiating a telephone call, constructed and operated in accordance with the principles of a preferred embodiment of the present invention.

Referring now to FIG. 1, there is shown a block diagram of the electrical circuitry implemented within the portable dialer device for automatically generating a pre-programmed sequence of tones and initiating a telephone call, constructed and operated in accordance with the principles of a preferred embodiment of the present invention. Dialer device 10 comprises a thin power source 12, such as a battery, a solar panel, or a power paper (i.e. a very thin power source), for supplying the power needed to generate the dialing sequence of tones and initiate the telephone call.

Power source 12 is connected to an activation unit 14. Activation unit 14 is implemented for manually or automatically activating the sequence of tones required for initiating the one or more telephone calls. The manual activation of the sequence of tones can be carried out, for example, by pressing a push-button 28 (FIG. 3*b*) or touching a touch pad or touch sensor, such as a capacitive touch sensor, represented by sensor 30 (FIG. 3*b*), when the dialer device is held in close proximity to the telephone handset. The portable dialer device 10 may be constructed with one or more of these alternative activation devices.

Activation of the sequence of tones can be further carried out automatically, for example, by further implementing one of several variations of a proximity sensor 32 in connection with activation unit 14. In accordance with one embodiment of the present invention, proximity sensor 32 functions as an optical proximity sensor. Sensor 32 could also be implemented as a capacitive proximity sensor. As a result, the sequence of tones is activated when the dialer device touches the telephone handset or even when the optical proximity or capacitive proximity sensor 32 senses that the dialer device is held in close proximity to the telephone handset.

In accordance with yet another embodiment of the present invention, the proximity sensor 32 may automatically activate the sequence of tones by functioning as a sound proximity sensor. In this embodiment, the sound proximity sensor senses the standard dial tone that is heard when the user picks up the telephone handset, and this dial tone then activates this sequence of tones.

The touch sensor 30 or the proximity sensor 32 may be designed so as to continually be activated, using a low-current drain arrangement to preserve the battery power. Alternatively, the pushbutton switch 28 can be arranged to activate the sensors 30 or 32 and place them on "standby", ready to perform their function.

Activation unit 14 is connected to a microprocessor 16. Microprocessor 16 is provided for storing and generating the sequence of tones of one or more relevant telephone numbers. In accordance with the preferred embodiment of the present invention, the portable dialer device is combined with a refrigerator magnet. However, the portable dialer device may be implemented within any other device, e.g. a pen, a clock, etc. The electrical circuitry is adapted to fit within the shape of the device.

In accordance with one embodiment of the present invention, microprocessor 16 may be implemented as a conventional DTMF (Dual-Tone Multi-Frequency) generator known in the art. The DTMF generator is provided for converting a multi-digit telephone number into a sequence of tones, according to a PSTN (Public Switched Telephone Networks) protocol known in the art.

In an alternative embodiment (see FIGS. 4-5), the microprocessor 16 has a read-only memory (ROM) and the dialer is implemented as a digital audio player, with the ROM pre-recorded with data representing tones. Implementation of such a digital audio player, small in size, simplifies the electrical circuitry and lowers the designing costs. The data representing tones may be recorded distinctly, or buried within an advertising jingle.

In this alternative embodiment of the present invention, microprocessor 16 is implemented to be operable as a MIDI (Musical Instrument Digital Interface) file. MIDI is a very expressive protocol defined by the MIDI Manufacturers Association for use by computerized musical instruments, A MIDI file is capable of virtually representing on a computerized musical instrument every sound or tone required for a complete musical performance.

Another embodiment of the present invention implements microprocessor 16 as an MP3 media player. Thus, when the dialer device is brought near a telephone handset, the MP3 player plays back the recorded sequence of data representing tones as a music file for initiating the telephone call.

Dialer device 10 further comprises a speaker 18. Speaker 18 is provided for presenting the required tone sequence as an audio signal in proximity to the microphone within the telephone handset and consequently initiates the telephone call. The presentation of the tone sequence by speaker 18 simulates a conventional dialing operation made by a user when dialing a telephone number on the telephone keypad.

In accordance with another embodiment of the present invention, the portable dialer device may enable programming more than one pre-programmed sequence of tones in relation to more than one telephone number. Hence, a user may have the option of selecting a different sequence of tones for initiating a different telephone call at different times.

In an alternative embodiment of the present invention, microprocessor 16 is implemented to generate the telephone number dialing sequence as data for use with a cellular telephone (FIGS. 2C-2D), or other communication device, which does not generate a dial tone when used. The inventive dialer device is activated by a proximity sensor or touch sensor, to communicate the telephone number dialing sequence to the cellular phone as data over an infra-red communication channel using an infrared transmitter 40, which transmits to an infra-red receiver 39 (see FIG. 2C). Thus, the data can be displayed on the cellular phone as a "new contact", labeled to identify the commercial entity.

Figure 2A:
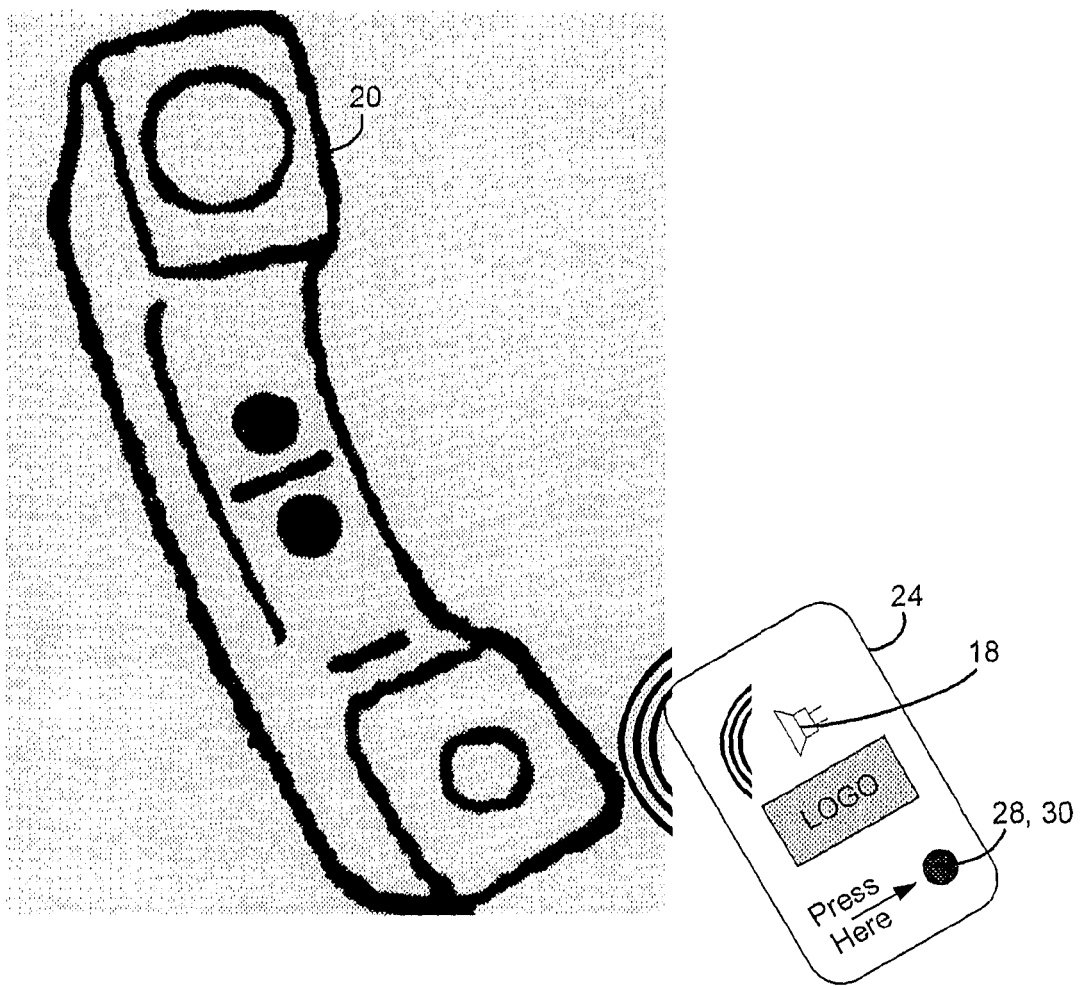
FIG. 2A is an illustration of the operation of the inventive magnet dialer device in close proximity to a telephone handset, in accordance with a preferred inventive method.
Figure 2B:
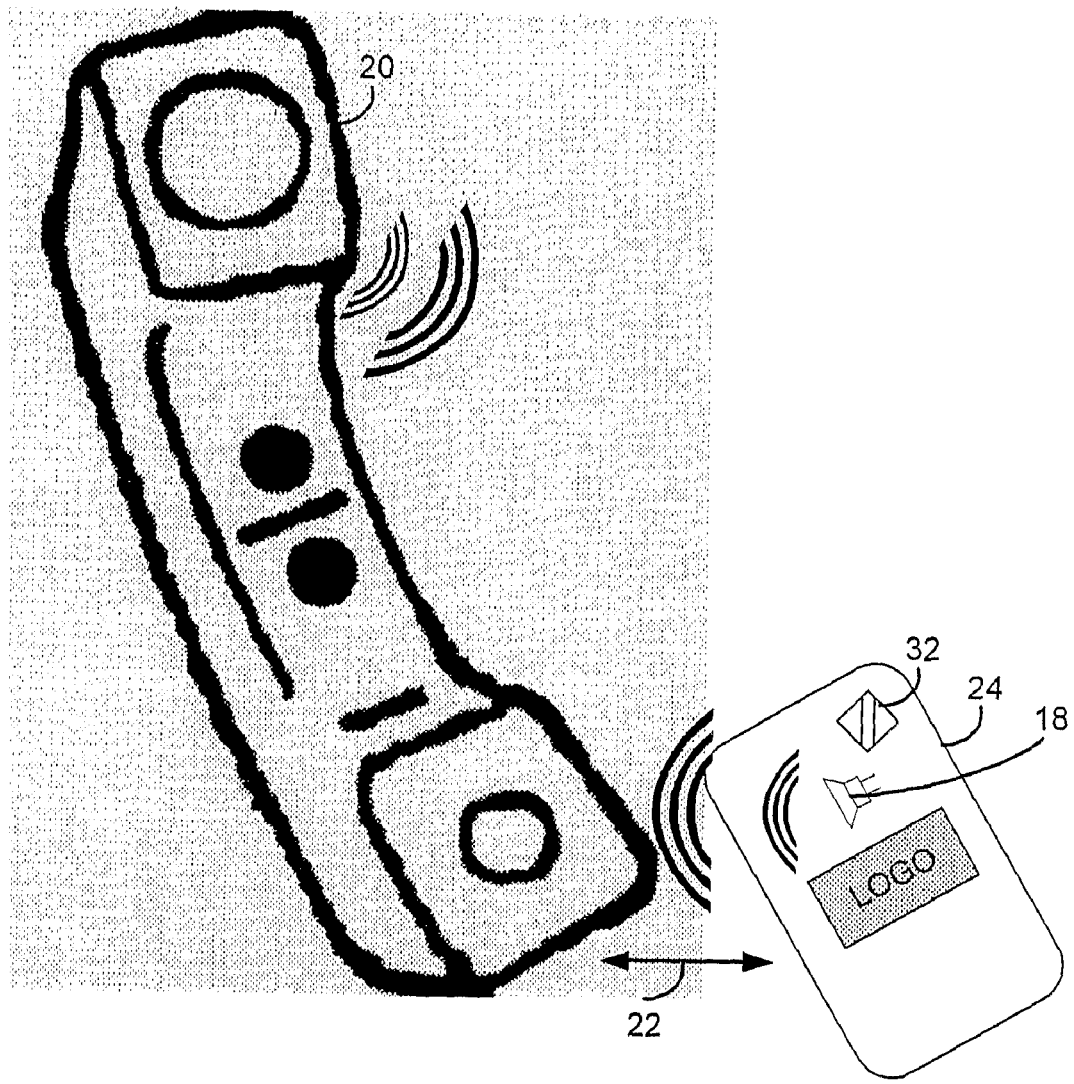
FIG. 2B is an illustration of the operation of the inventive magnet dialer device in close proximity to a telephone handset, in accordance with an alternative inventive method.
Figure 2C:
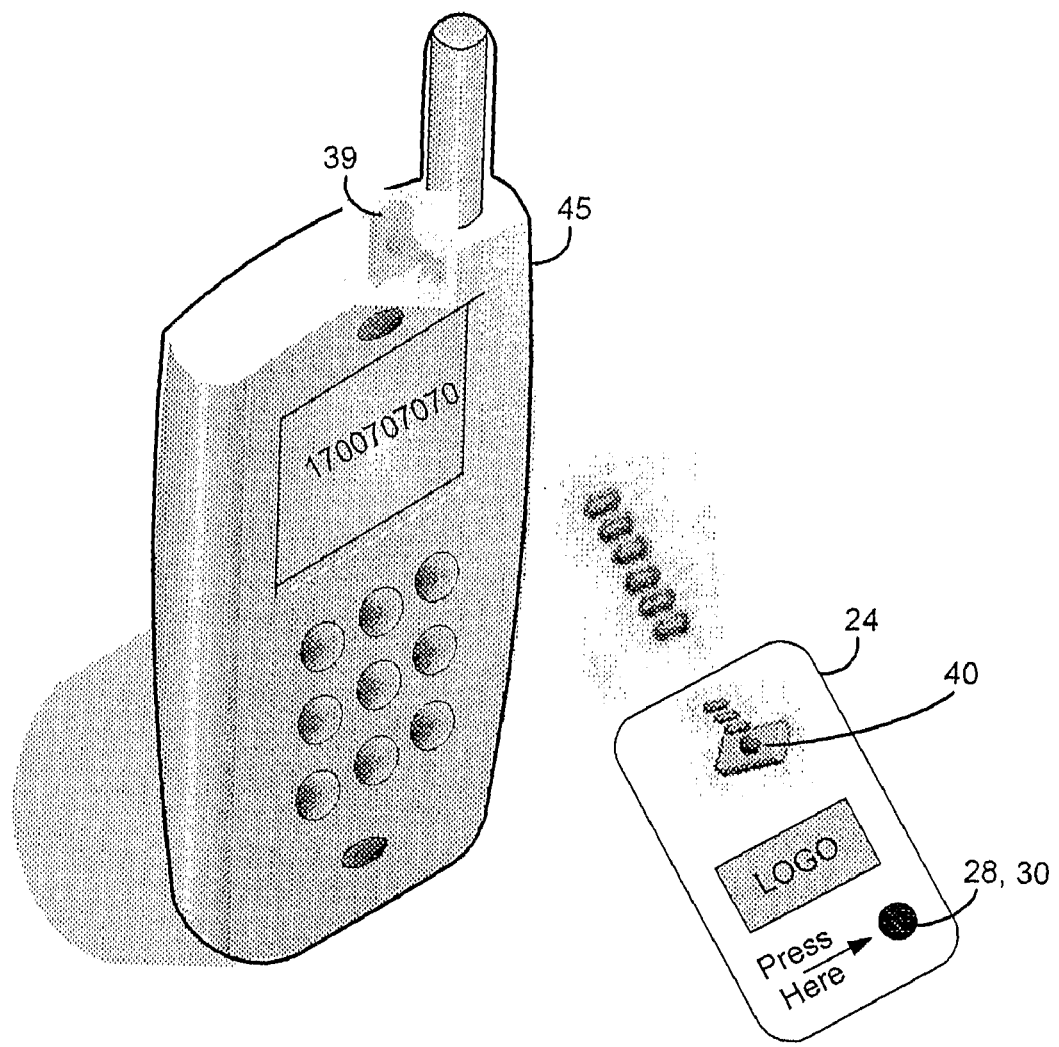
FIG. 2C shows the magnet dialer device for use with a cellular telephone, employing an infra-red communication channel for communication of the telephone number as data.
Figure 2D:
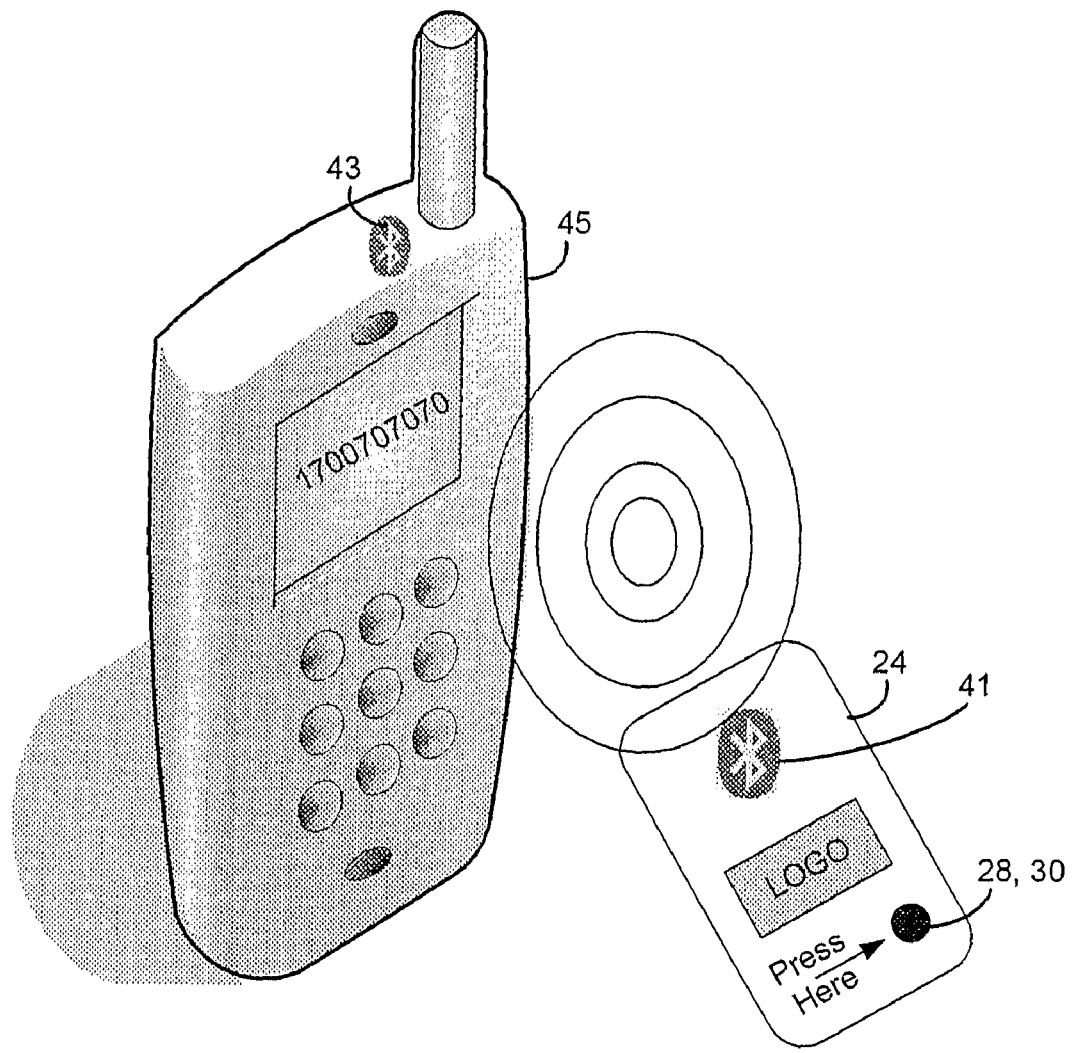
FIG. 2D shows the magnet dialer device for use with a cellular telephone, employing the BT protocol for communication of the telephone number as data.

An alternative communication channel for communicating the telephone number dialing sequence as data to a cellular phone may be based on the Bluetooth protocol, using BT antenna 41, which transmits to a BT receiver 43 (see FIG. 2D).

Thus, it will be appreciated by those skilled in the art that there are several variations for communication of the telephone number dialing sequence, using speaker 18 for audio tones, or infra-red communication or the BT protocol for communication of the sequence as data FIG. 2A is an illustration of the operation of a magnet dialer device 24 in close proximity to a telephone handset 20, in accordance with a preferred method of the present invention. Magnet dialer device 24 comprises the electrical circuitry of dialer device 10 (see FIG. 1). The device 24 is held in close proximity to telephone handset 20 and the pushbutton 28 is pressed. The pushbutton 28 or touch sensor 30 then automatically activates the microprocessor 16 within the magnet dialer device 24, to initiate the required telephone call.

FIG. 2B is an illustration of the operation of a magnet dialer device 24 in close proximity to a telephone handset 20, in accordance with an alternative method of the present invention. Double-headed arrow 22 shows that upon detection of the handset 20 by the proximity sensor 32 (optical, capacitive, or sound) the device 24 automatically activates the microprocessor 16, to initiate the telephone call.

FIG. 2C shows magnet dialer device 24 for use with a cellular telephone 45, employing the infra-red transmitter 40 for communication of the telephone number as data.

FIG. 2D shows magnet dialer device 24 for use with a cellular telephone 45, employing the BT protocol for communication of the telephone number as data via antenna 41.

Figure 2E:
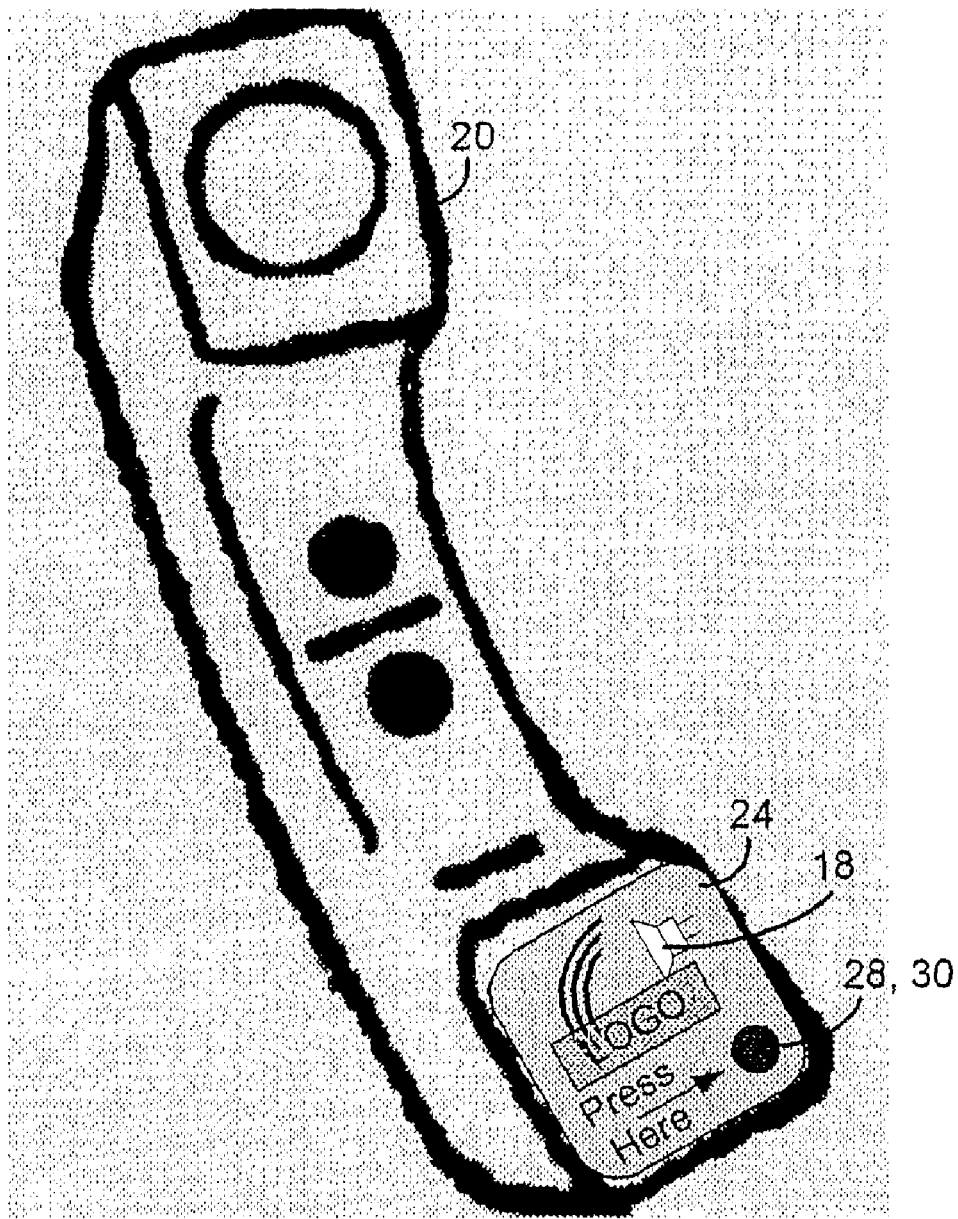
FIG. 2E shows the dialer device arranged for mounting on a telephone handset.

FIG. 2E shows dialer device 24 (without a magnet) arranged for removable mounting on telephone handset 20, by use of a sticky-type adhesive on the back side of device 24.

Figure 3A:
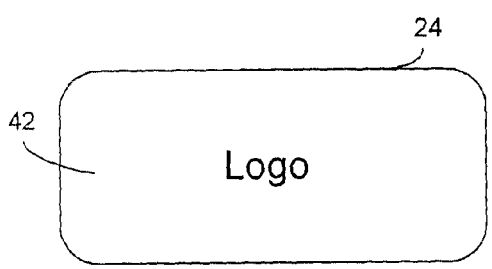
FIG. 3A shows the front side of the refrigerator magnet dialer, in accordance with a preferred embodiment of the present invention.

FIG. 3A shows the front side 42 of the refrigerator magnet dialer 24, in accordance with a preferred embodiment of the present invention. The logo of the company, its telephone number and other useful information may be printed on the front side 42 of the magnet dialer.

Figure 3B:
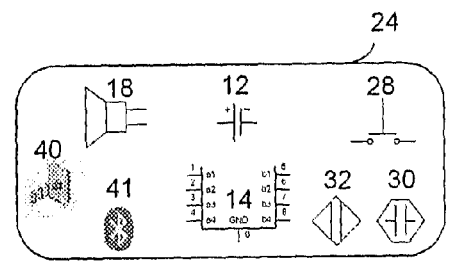
FIG. 3B shows the set of components for construction of the refrigerator magnetdialer, in accordance with a preferred embodiment of the present invention.

FIG. 3B shows the set of components for construction of the refrigerator magnet dialer 24, in accordance with a preferred embodiment of the present invention. The different components (numerals 30 to 40) comprising the electrical circuitry of the dialer device are mounted as components on a printed circuit board placed within the magnet dialer 24. These components include a pushbutton 28, a touch sensor 30, a proximity sensor 32 (optical, capacitive, sound), a microprocessor 16, a power source 12, and a speaker 18.

Figure 4:
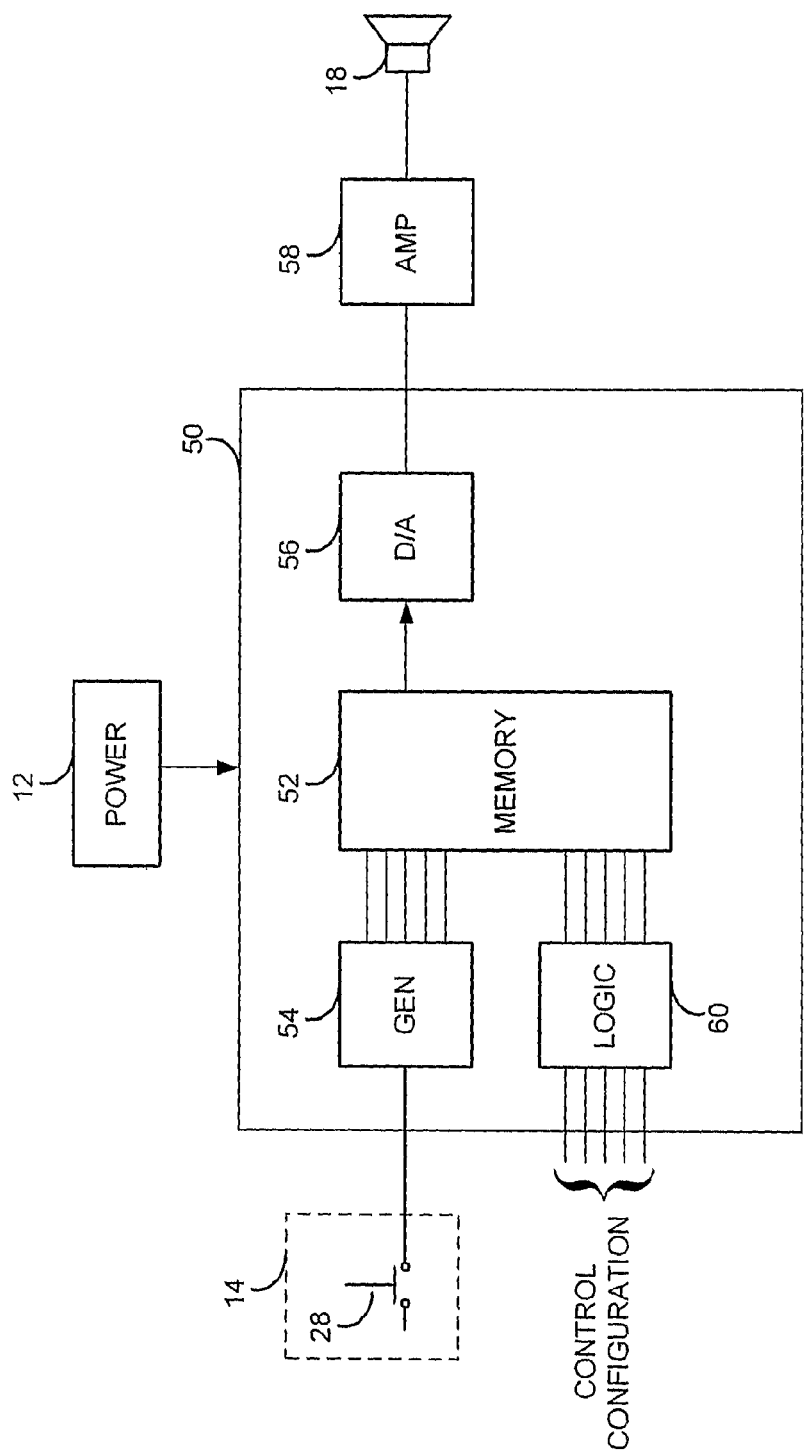
FIG. 4 shows a block diagram of an alternative embodiment of the circuitry for implementing a portable dialer device.

Referring now to FIG. 4, there is shown a block diagram of an alternative embodiment of the circuitry for implementing a portable dialer device in accordance with the principles of the present invention.

In this embodiment, the microprocessor 16 is replaced by a digital audio player, implemented as a sampling sequencer 50 configured an ASIC, with a read-only memory (ROM) 52 pre-recorded with data representing tones. An address generator 54 is used to select the stored data in memory 52, and the D/A converter 56 converts the data to analog output via a direct analog adder, or PWM-based conversion, or any other conventional method. The analog output is fed via an amplifier 58, to speaker 18. Power is provided by power source 12.

Memory 52 may be provided as flash memory, programmable ROM, $E^2$prom, $I^2C$, or any other non-volatile memory.

A control logic block 60 enables customization of the operation of sequencer 50, so that it may be configured for specific applications, using a particular pre-selected control configuration. This is achieved by providing selected inputs from control logic block 60 to the memory 52, to pre-select a selected group of available addresses in memory 52. For example, more than one tone sequence can be stored in memory 52, and by use of control logic block 60, a chosen set of the group of available addresses may be pre-selected from the memory 52. By choice of the appropriate available addresses, the desired tone sequence can be chosen. The inputs from control logic block 60 may be pre-selected via dip switches, or configuration jumpers. The pre-selected configuration may be chosen by the user, or the manufacturer only.

In operation, sampling sequencer 50 is activated by activation unit 14 which operates as described in connection with the embodiment of FIG. 1. As shown, activation unit 14 has pushbutton 28 arranged to activate the sampling sequencer 50, but it may also utilize touch sensor 30 or proximity sensor 32.

As with the embodiment of FIG. 1, in addition to the use of speaker 18, communication of the telephone dialing sequence may utilize several variations including infra-red communication or the BT protocol.

Figure 5:
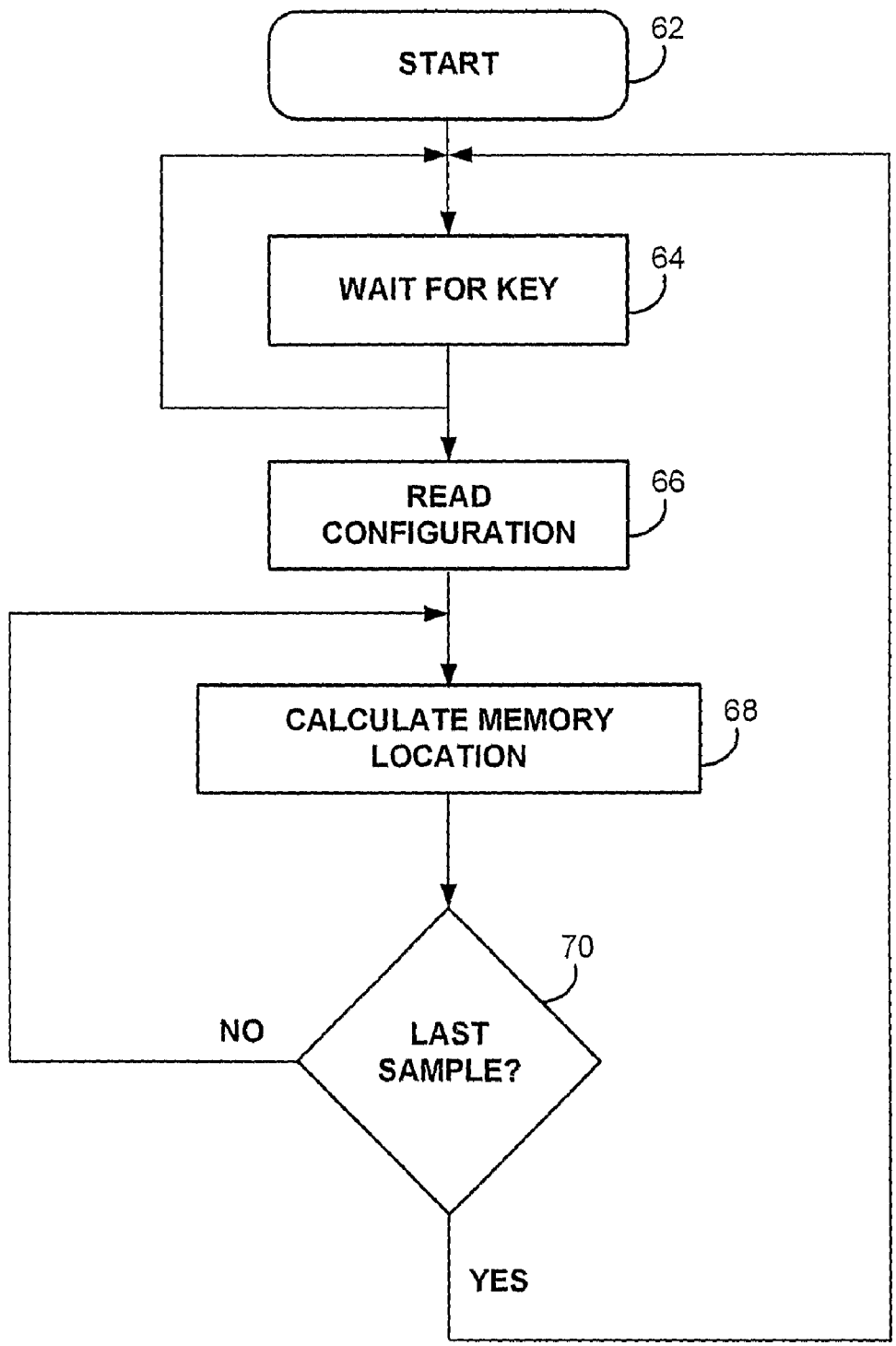
FIG. 5 shows a control flow diagram of the operation of the alternative embodiment shown in FIG. 4.

Referring now to FIG. 5, there is shown a control flow diagram of the operation of the alternative embodiment of the portable dialer device shown in FIG. 4.

Operation of the sequencer 50 begins in start block 62, with initialization of the memory 52 and address generator 54 values. In block 64, the sequencer waits to detect an activation input, such as a pushbutton 28 signal. In block 66, the sequencer 50 reads the configuration established by control logic block 60, and in block 68, the memory location is calculated, and the data stored at the selected address is output to the D/A converter 56, to provide a component of the tone sequence used in initiating the required telephone call. In block 70, the sequencer 50 checks to see if there are additional addresses associated with the tone sequence, by checking if the last sample of the tone component was provided. If there are no more samples, the operation returns to block 65, otherwise the operation continues in block 68.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A portable dialer device for initiating a telephone call to one or more predetermined telephone numbers using a pre-recorded and stored audio file when the portable dialer device is in proximity to a telephone handset, said portable dialer device comprising:
   means connected to a power source, said means for storing and providing one or more pre-recorded audio files stored as data representing tones in a dialing sequence of the one or more telephone numbers,
   wherein each of said audio files includes an audio jingle associated with and identifying a particular entity among a group of businesses, medical services, institutions and the like,
   an activation unit connected to said storing and providing means, for activating said audio file required for initiating the telephone call;
   communication means for presenting the audio file representing tones of a telephone dialing sequence as a signal when said portable dialer device is in proximity to the telephone handset; and
   a visual element comprising a logo identifying said one of said entities,
   wherein said visual element enables activation of said activation unit by a single-touch, thereby simplifying communication with said identified entity.

2. The device of claim 1 wherein said storing and providing means is a microprocessor.

3. The device of claim 1 wherein said storing and providing means is a sampling sequencer.

4. The device of claim 1 provided as a digital audio player.

5. The device of claim 2 wherein said microprocessor is arranged to operate as an MP3 media player.

6. The device of claim 1 wherein said activation unit is a touch sensor.

7. The device of claim 1 wherein said activation unit operates automatically when the portable dialer device is brought in proximity to the telephone handset.

8. The device of claim 7 wherein said activation unit is a proximity sensor for detecting the proximity of the telephone handset to said device.

9. The device of claim 8 wherein said proximity sensor is a sound sensor.

10. The device of claim 8 wherein said proximity sensor is a capacitive sensor.

11. The device of claim 8 wherein said proximity sensor is an optical sensor.

12. The device of claim 1 wherein said communication means is an infra-red communication channel for providing said signal as data.

13. The device of claim 1 wherein said communication means is an antenna for providing said signal as data in the BT protocol.

14. The device of claim 1 arranged for mounting as a magnet-type hanging device.

15. The device of claim 1 arranged for removable mounting with a sticky-type adhesive.

16. A method for initiating a telephone call to one or more predetermined telephone numbers using a portable dialer device having a pre-recorded and stored audio file when the portable dialer device is in proximity to a telephone handset, said method comprising:
   storing and providing pre-recorded audio files stored as data representing tones in a dialing sequence of the one or more predetermined telephone numbers in the portable dialer device;
   wherein each of said audio files includes an audio jingle associated with and identifying a particular entity among a group of businesses, medical services, institutions and the like,
   providing a visual element compromising a logo identifying said one of said entities, thereby simplifying communication with said identified entity;
   activating the pre-recorded and stored audio file required for initiating the telephone call by a single-touch of said visual element; and
   presenting the audio file representing tones in a dialing sequence as a signal when said portable dialer device is in close proximity to the telephone handset.

17. A method for initiating a telephone call to one or more predetermined telephone numbers using a portable dialer device containing a pre-recorded and stored audio file, said method comprising:
   providing a portable dialer device comprising:
      means connected to a power source, said means for storing and providing one or more pre-recorded and stored audio files stored as data representing tones in a dialing sequence of the one or more telephone numbers,
      wherein each of said audio files includes an audio jingle associated with and identifying a particular entity among a group of businesses, medical services, institutions and the like,
      an activation unit connected to said storing and providing means, for activating the pre-recorded and stored audio file required for initiating the telephone call;
      communication means for presenting the pre-recorded audio file as a signal when said portable dialer device is in proximity to the telephone handset, providing a visual element compromising a logo identifying said one of said entities,
wherein said visual element enables activation of said activation unit by a single-touch, thereby simplifying communication with said identified entity; and placing the portable dialer device in proximity to the telephone handset, such that said activation unit activates the pre-recorded audio file to initiate the telephone call.

* * * * *